US010343662B2

(12) United States Patent
Masuda

(10) Patent No.: US 10,343,662 B2
(45) Date of Patent: Jul. 9, 2019

(54) BRAKE DEVICE SYSTEM

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 86 days.

(21) Appl. No.: 15/445,124

(22) Filed: Feb. 28, 2017

(65) Prior Publication Data

US 2017/0166178 A1    Jun. 15, 2017

Related U.S. Application Data

(63) Continuation of application No. PCT/JP2015/074360, filed on Aug. 28, 2015.

(30) Foreign Application Priority Data

Sep. 5, 2014   (JP) .................. 2014-180963

(51) Int. Cl.
*B60T 8/58* (2006.01)
*B60T 7/12* (2006.01)
(Continued)

(52) U.S. Cl.
CPC .............. *B60T 8/58* (2013.01); *B60T 7/12* (2013.01); *B60T 8/00* (2013.01); *B60T 8/72* (2013.01);
(Continued)

(58) Field of Classification Search
CPC ..... B60T 7/12; B60T 8/00; B60T 8/72; B60T 13/74; F16D 66/00
(Continued)

(56) References Cited

U.S. PATENT DOCUMENTS 5,470,135 A   11/1995  Shitani et al.
5,651,593 A    7/1997  Shitani et al.
(Continued)

FOREIGN PATENT DOCUMENTS

CN       2782496       5/2006
CN     101400919       4/2009
(Continued)

OTHER PUBLICATIONS

International Search Report dated Nov. 17, 2015 in corresponding International Application No. PCT/JP2015/074360.
(Continued)

*Primary Examiner* — Thomas G Black
*Assistant Examiner* — Luat T Huynh

(57) ABSTRACT

This brake device system includes a plurality of brake devices mounted to a vehicle, each brake device including a brake rotor, a friction pad, friction pad driving assembly, and a control device. The control device is provided with: braking/stoppage determination section configured to cause the friction pad to come into contact with the brake rotor of each brake device, and determine whether or not the vehicle is braking or being kept stopped; and heat conduction suppressing section configured to, when the braking/stoppage determination section has determined that the vehicle is braking or being kept stopped, reduce the braking force of a part of the plurality of brake devices, thereby to reduce heat conductivity of brake friction heat to the friction pad driving assembly.

6 Claims, 7 Drawing Sheets

(51) Int. Cl.
   *B60T 8/00* (2006.01)
   *F16D 66/00* (2006.01)
   *B60T 8/72* (2006.01)
   *B60T 13/74* (2006.01)
   *F16D 55/225* (2006.01)
   *F16D 121/24* (2012.01)
   *F16D 125/40* (2012.01)

(52) U.S. Cl.
   CPC ............ *B60T 13/74* (2013.01); *F16D 55/225* (2013.01); *F16D 66/00* (2013.01); *F16D 2066/006* (2013.01); *F16D 2121/24* (2013.01); *F16D 2125/40* (2013.01)

(58) Field of Classification Search
   USPC .......................................................... 701/70
   See application file for complete search history.

(56) References Cited

U.S. PATENT DOCUMENTS

| | | | |
|---|---|---|---|
| 6,199,670 B1* | 3/2001 | Shirai | B60T 13/74 188/158 |
| 6,397,981 B1 | 6/2002 | Tamasho et al. | |
| 6,598,946 B2* | 7/2003 | Nagae | B60K 23/0808 180/249 |
| 7,810,616 B2 | 10/2010 | Nakazeki | |
| 8,958,966 B2* | 2/2015 | Nohira | B60T 8/885 701/70 |
| 9,403,519 B2* | 8/2016 | Shimada | B60T 7/042 |
| 2008/0110704 A1 | 5/2008 | Nakazeki | |
| 2009/0127038 A1 | 5/2009 | Fenna | |

FOREIGN PATENT DOCUMENTS

| | | | |
|---|---|---|---|
| CN | 103072568 | 5/2013 | |
| DE | 195 00 834 A1 | 7/1996 | |
| EP | 0 924 127 A2 | 6/1999 | |
| JP | 58-57526 | 4/1983 | |
| JP | 62-146027 | 9/1987 | |
| JP | 3380315 | 10/1994 | |
| JP | 8-105472 | 4/1996 | |
| JP | 2001-80495 | 3/2001 | |
| JP | 2003-254364 | 9/2003 | |
| JP | 2006-194356 | 7/2006 | |
| WO | WO 02/064408 A1 | 8/2002 | |
| WO | WO-02064408 A1 * | 8/2002 | ............... B60T 5/00 |
| WO | 2007/091001 | 8/2007 | |
| WO | 2012/045953 | 4/2012 | |

OTHER PUBLICATIONS

International Preliminary Report on Patentability dated Mar. 16, 2017 in corresponding International Patent Application No. PCT/JP2015/074360.

Office Action dated May 15, 2018, in corresponding Japanese Patent Application No. 2014-180963, 9 pgs.

Extended European Search Report dated May 4, 2018, in corresponding European Patent Application No. 15837260.7, 11 pgs.

Chinese Office Action dated Sep. 5, 2018 issued in corresponding Chinese Patent Application No. 201580047068.8 (8 pages).

European Office Action dated Mar. 22, 2019 in European Patent Application No. 15837260.7 (6 pages).

* cited by examiner

Fig. 4
Graph (a)
※F=(F1+F2)/2
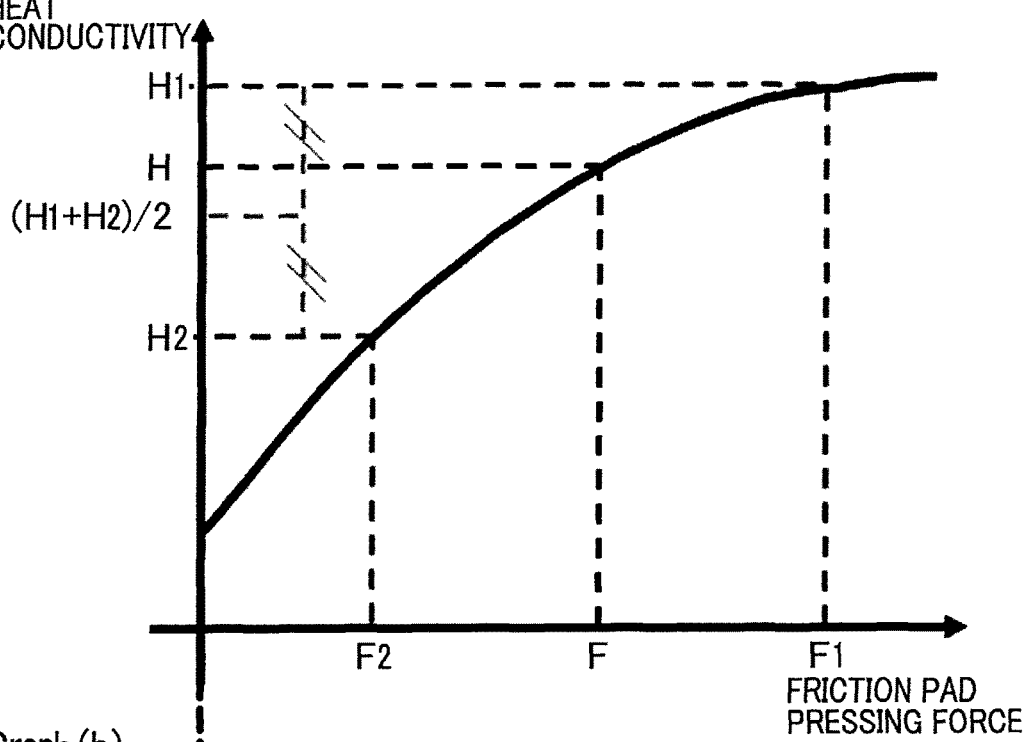
Graph (b)
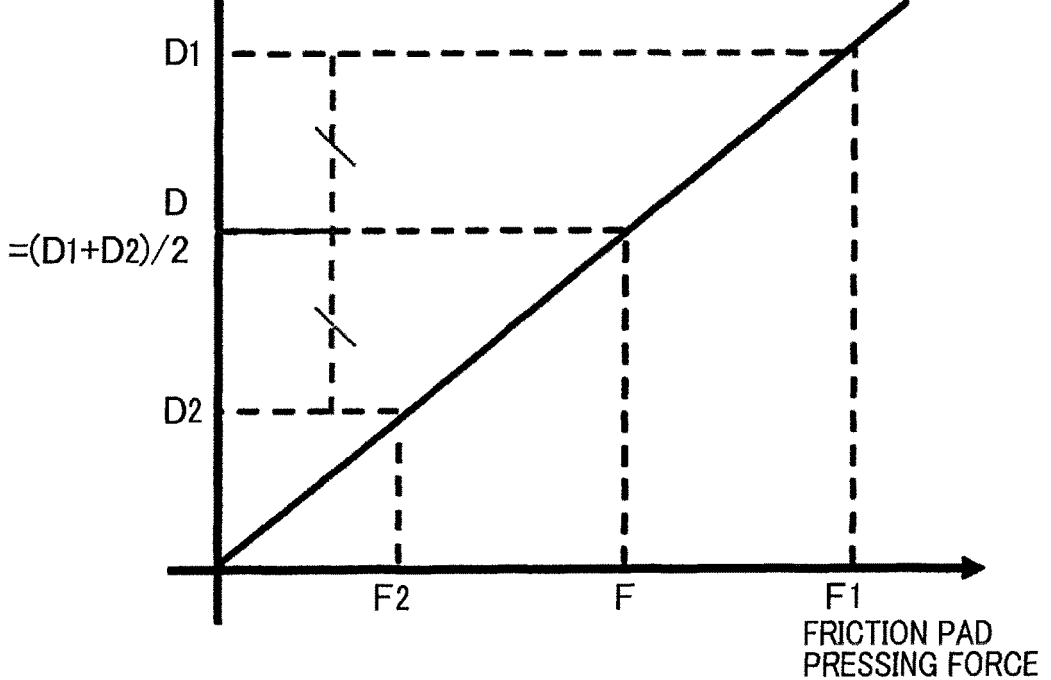

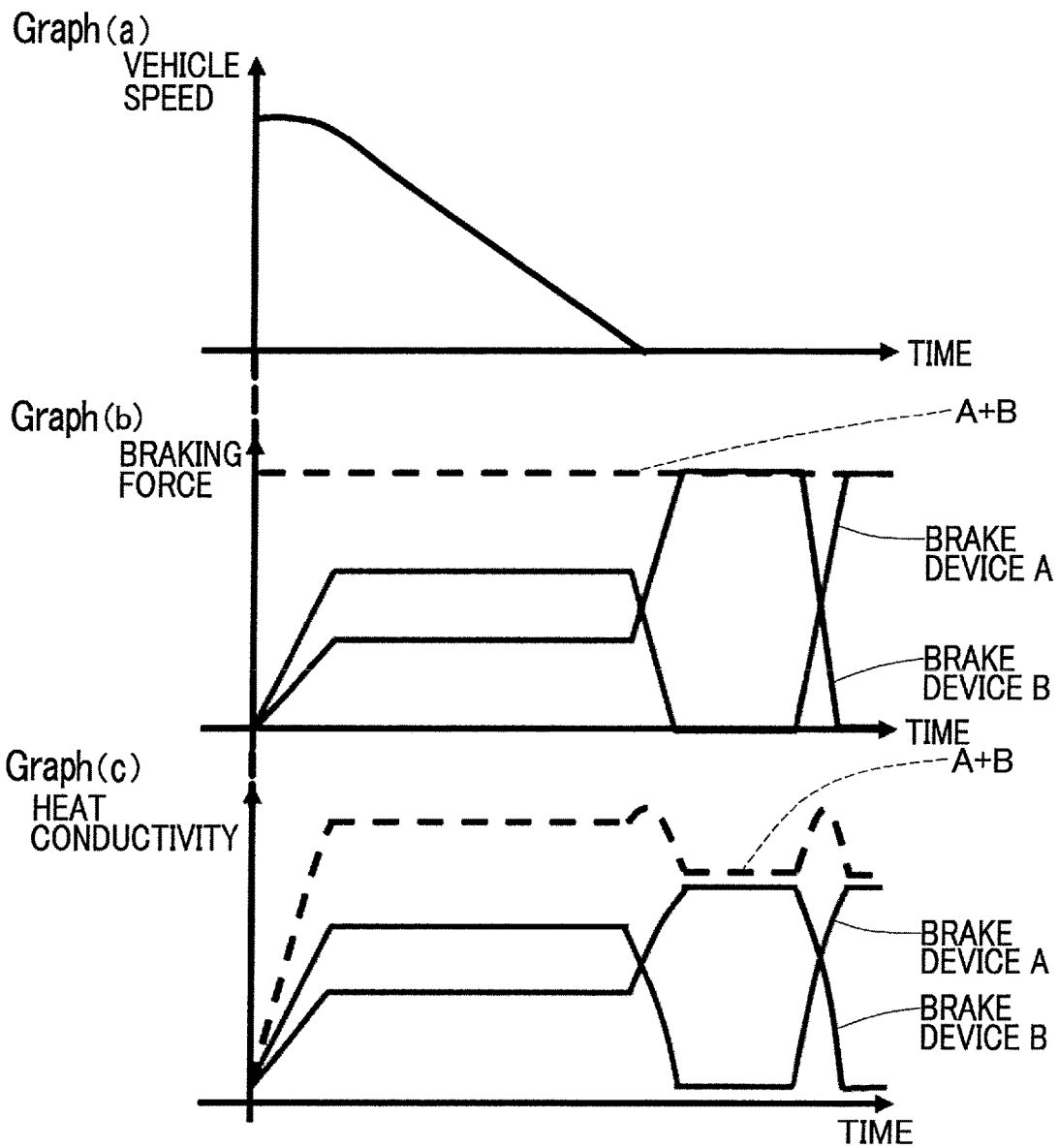

BRAKE DEVICE SYSTEM

CROSS REFERENCE TO THE RELATED APPLICATION

This application is a continuation application, under 35 U.S.C. § 111(a), of international application No. PCT/JP2015/074360, filed Aug. 28, 2015, which is based on and claims Convention priority to Japanese patent application No. 2014-180963, filed Sep. 5, 2014, the entire disclosure of which is herein incorporated by reference as a part of this application.

BACKGROUND OF THE INVENTION (Field of the Invention)

The present invention relates to a brake device system including a plurality of brake devices mounted to a vehicle, and relates to a technique of suppressing temperature rise in the brake devices.

(Description of Related Art)

The following techniques have been proposed as heat insulation methods for brakes.

(1) A disc brake having a heat insulating material disposed on a rear surface of a friction pad (Patent Document 1).

(2) A brake having a heat insulating material sandwiched between a piston and a friction pad (Patent Document 2).

(3) An electric brake device including a ball screw nut that is rotated by a driving force of an electric motor, and a ball screw shaft that is threadingly engaged or coupled movably forward and backward with the ball screw nut via a plurality of balls, wherein a material having low heat conductivity is used for the balls (Patent Document 3).

(4) An electric brake device using a planetary roller screw (Patent Document 4).

RELATED DOCUMENT

Patent Document

[Patent Document 1] JP Laid-open Patent Publication No. S58-057526

[Patent Document 2] JP Laid-open Utility Model Publication No. S62-146027

[Patent Document 3] JP Laid-open Patent Publication No. 2003-254364

[Patent Document 4] JP Laid-open Patent Publication No. 2006-194356

In a friction brake device that converts kinetic energy of a vehicle into friction energy as disclosed in Patent Documents 1 to 4, it is an important issue to secure durability of the brake device against heat generated by friction. In a hydraulic brake device as disclosed in Patent Documents 1 and 2, if heat generated in a brake rotor is transferred to brake fluid and causes excessive temperature rise of the brake fluid, the temperature of water component in the brake oil may reach a boiling point of water, which may cause vapor lock.

Therefore, Patent Documents 1 and 2 each propose a technique of disposing a heat insulating material on a friction pad. However, if improved heat insulating performance is desired, a mounting space, durability, cost, etc. of the heat insulating material may become issues to be solved.

In an electric brake device as disclosed in Patent Documents 3 and 4, heat resistances of electrical components such as a motor, a sensor, etc. mounted to the electric brake device may become issues to be solved. For example, regarding a motor, if heat transferred from a brake rotor causes temperature rise of the motor, the motor should be designed so as to reduce copper loss of a motor coil with respect to a motor torque, which may cause an increase in the size of the motor. Also in this case, increase in the mounting space, cost, etc. of the motor may become issues to be solved.

Hence, Patent Document 3 proposes a technique of forming balls of a ball screw of an electric actuator by using a material having low heat conductivity. However, it is difficult to realize all of low heat conductivity, secured durability, and cost reduction.

SUMMARY OF THE INVENTION

It is an object of the present invention to provide a brake device system including a plurality of brake devices mounted to a vehicle, which system is capable of reducing heat conductivity from a brake rotor to a brake caliper, ensuring durability of each brake device, and achieving cost reduction.

Hereinafter, for convenience of easy understanding, a description will be given with reference to the reference numerals in embodiments.

A brake device system according to the present invention includes a plurality of brake devices mounted to a vehicle, each brake device including a brake rotor 5, a friction pad 6 configured to come into contact with the brake rotor 5 and generate a braking force, a friction pad driving assembly Mk configured to cause the friction pad 6 to come into contact with the brake rotor 5, and a control device 7 configured to control the braking force by using the friction pad driving assembly Mk. The control device 7 includes: a braking/stoppage determination section 30 configured to cause the friction pad 6 to come into contact with the brake rotor 5 of each of the brake devices and determine whether or not the vehicle is braking or being kept stopped (or being at stoppage); and a heat conduction suppressing section 35 configured to, when the braking/stoppage determination section 30 has determined that the vehicle is braking or being kept stopped, reduce the braking force of a part of the plurality of brake devices, thereby to reduce heat conductivity of brake friction heat to the friction pad driving assembly Mk.

According to this configuration, by the operation of a brake operation portion 29, the control device 7 controls the braking force via the friction pad driving assembly Mk. The friction pad driving assembly Mk causes the friction pad 6 to come into contact with the brake rotor 5, thereby to generate a braking force. The friction pad driving assembly Mk is provided in a brake caliper Bk. When a vehicle is traveling, the friction pad driving assembly Mk performs a normal braking operation from the start of braking, and thereafter, if the vehicle speed becomes, for example, zero or a low speed near zero, the braking/stoppage determination section 30 causes the friction pad 6 to come into contact with each brake rotor 5, and determines whether or not the vehicle is braking or being kept stopped.

When the result of the determination is that the vehicle is braking or being kept stopped, the heat conduction suppressing section 35 reduces the braking force of the part of the plurality of brake devices, thereby to reduce heat conductivity of brake friction heat to the friction pad driving assembly Mk, that is, the brake caliper Bk. For example, optimum balance of the braking forces and/or rotation of reducing the braking forces of the brake devices may be determined on the basis of the degree of temperature rise of the brake rotor 5, which is estimated from, in a case of a four wheel car, the vehicle speed and deceleration degree, the front and rear brake balance, the volume of the brake rotor 5, the volume of each brake device, etc.

When a hydraulic brake device is adopted as the brake device, reduction in heat conductivity of brake friction heat to the brake caliper Bk can suppress transfer of heat (brake friction heat) generated by friction between the brake rotor 5 and the friction pad 6 to the brake fluid. Therefore, excessive temperature rise of the brake fluid can be avoided, thereby avoiding vapor lock. Further, since a heat insulating material, which is provided in the conventional art, need not be disposed on the rear surface of the friction pad, the mounting space for the heat insulating material need not be secured, and cost reduction can be achieved.

When an electric brake device Db is adopted as the brake device, since transfer of heat (brake friction heat) generated by friction between the brake rotor 5 and the friction pad 6 to an electric actuator of the electric brake device Db is suppressed, heat load on the electric actuator can be reduced. As described above, according to the above configuration, it is possible to reduce heat conductivity, to the brake caliper, of brake friction heat which is generated by friction between the brake rotor and the friction pad 6, to secure durability of each brake device, and to achieve cost reduction.

The heat conduction suppressing section 35 may have a function of, while the braking force of the part of the plurality of brake devices is reduced, compensating for the reduction of the braking force by using or operating the other brake devices, thereby to keep a total sum of the braking forces of all the brake devices equal to a value in a case where the braking force of the part of the plurality of brake devices is not reduced. Thus, even when the braking force of the part of the plurality of brake devices is reduced, since the total sum of the braking forces of all the brake devices is kept constant, undesirable increase in the braking distance can be avoided.

The heat conduction suppressing section 35 may cause reduction in the braking force of the part of the plurality of brake devices, in a case where a speed of the vehicle is lower than or equal to a threshold value. The threshold value can be arbitrarily set to, for example, zero or a value near zero, on the basis of a result of an experiment, simulation, or the like. When the vehicle speed is zero or the low speed near zero, adverse effect on behavior and/or motion characteristics of the vehicle can be reduced. The heat conduction suppressing section 35 can reduce the braking force of the part of the plurality of brake devices under a condition that adverse effect on the behavior and/or motion characteristics of the vehicle is small.

The vehicle may be provided with one or more brake devices at each of four quadrants about the center of gravity on a plane orthogonal to a direction of the gravity that acts on the vehicle. When causing the heat conduction suppressing section 35 to operate, the control device 7 may set a braking force of each brake device such that a turning moment of the vehicle, which is caused by an operation of the brake device, becomes lower than or equal to a predetermined value. The predetermined value is set on the basis of a result of a test, simulation, or the like.

When the vehicle is traveling, if only the brake device provided on one quadrant among the brake devices provided respectively on the four quadrants is operated, undesirable turning moment occurs in the vehicle. Therefore, the braking force of each brake device is set so that the turning moment of the vehicle becomes lower than or equal to a predetermined value, whereby the behavior of the vehicle can be stabilized while suppressing, as much as possible, the turning moment of the vehicle caused by the operation of the brake device.

Each brake device may be provided with a temperature estimation section 37 configured to estimate a temperature of the brake rotor 5 or the friction pad 6 of the brake device. The control device 7 may cause the heat conduction suppressing section 35 to operate, when the temperature estimated in any temperature estimation section 37 is higher than or equal to a threshold value. A temperature rise of each brake device during braking may be grasped through a test, simulation, or the like, and the threshold value may be set on the basis of the grasped result.

The friction pad driving assembly Mk may include an electric motor 2, and a linear motion mechanism 4 configured to convert rotary motion of the electric motor 2 into linear motion of the friction pad 6. In this case, since the heat conduction suppressing section 35 reduces heat conductivity of brake friction heat to the friction pad driving assembly Mk, the design to reduce copper loss of motor coil of the electric motor 2 is reconsidered, whereby reduction in motor size can be achieved. Thus, the mounting space of the electric motor 2 can be reduced. Further, since the linear motion mechanism 4 need not be composed of components having high heat-resistance, cost reduction can be achieved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

In FIG. 4, Graphs (a) and (b) show a correlation of heat conductivity and a correlation of brake force, respectively, with respect to a pressing force of a friction pad in the brake device system;

In FIG. 5, Graphs (a) to (c) are functional concept diagrams of heat conduction suppressing section in the brake device system, regarding respective characteristics with respect to time at braking;

DESCRIPTION OF EMBODIMENTS

Figure 1:
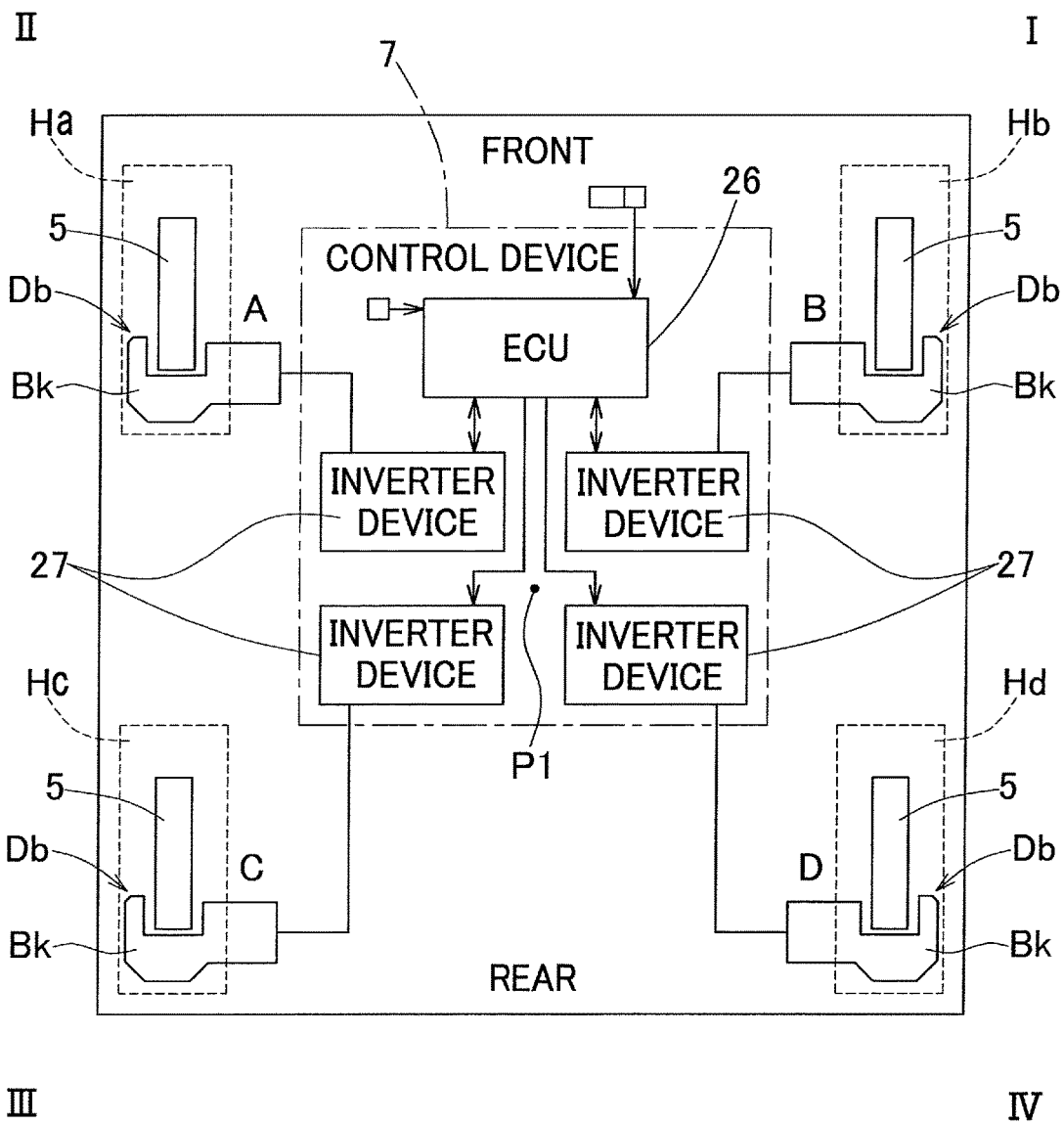
FIG. 1 is a schematic diagram showing a configuration of a brake device system according to an embodiment of the present invention.

A brake device system according to an embodiment of the present invention will be described with reference to FIGS. 1 through 7. FIG. 1 is a diagram schematically showing a configuration of a brake device system in which brake devices are mounted to wheels Ha, Hb, Hc, and Hd of a four wheel car as a vehicle. In this example, an electric brake device Db is adopted as each of the brake devices. Each electric brake device Db includes a brake rotor 5, a brake caliper Bk, and a control device 7.

Figure 2:
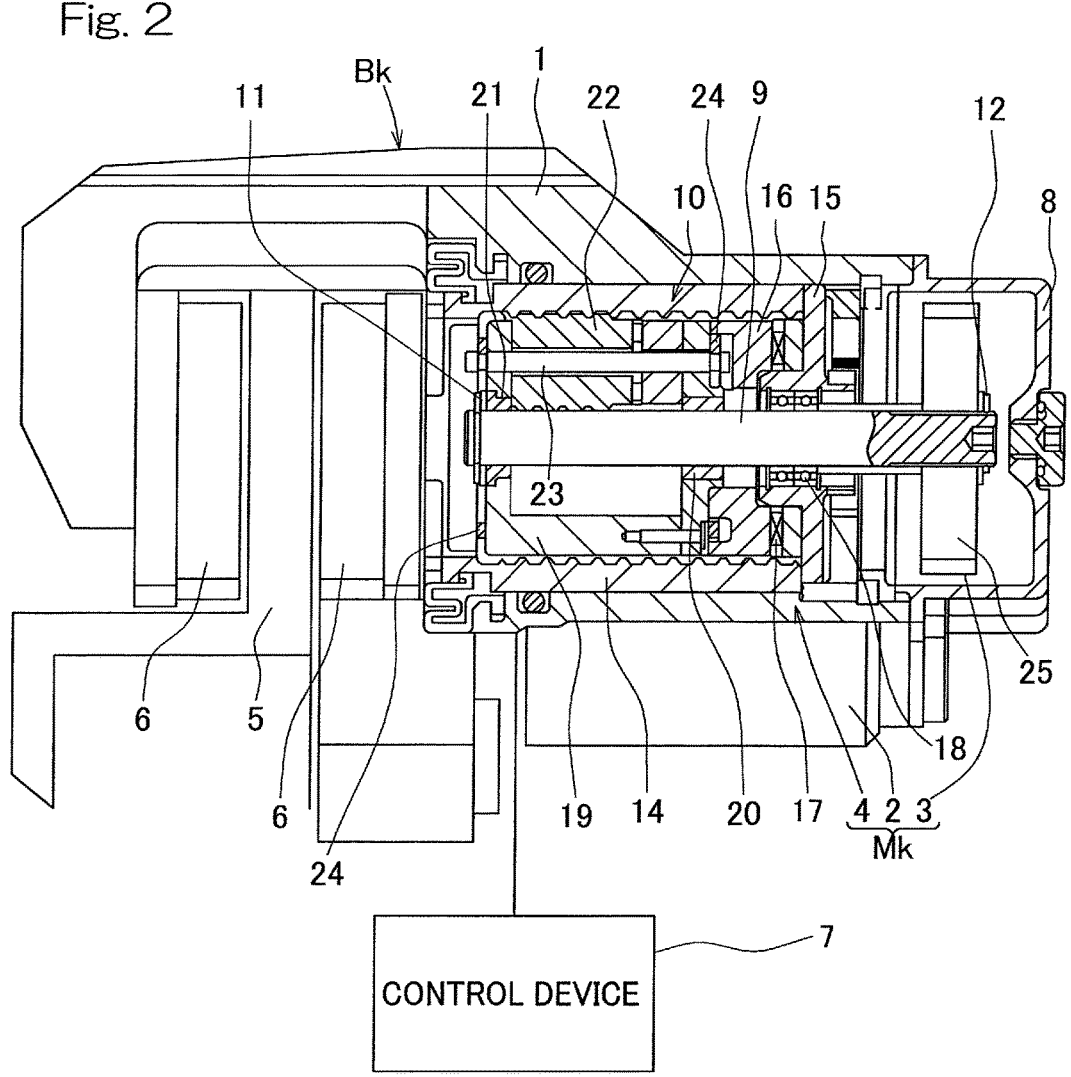
FIG. 2 is a longitudinal cross-sectional view of a main part of each brake device in the brake device system.

As shown in FIG. 2, the brake caliper Bk includes: a friction pad 6 that comes into contact with the brake rotor 5 and generate a braking force; and a friction pad driving assembly Mk that causes the friction pad 6 to come into contact with the brake rotor 5. The control device 7 controls the friction pad driving assembly Mk to control the braking force. As shown in FIG. 1, in this vehicle, the brake calipers Bk and the like of the brake devices Db are arranged on four quadrants (a first quadrant, a second quadrant, a third quadrant, and a fourth quadrant), respectively, about a center of gravity P1 on a plane orthogonal to the direction of the gravity that acts on this vehicle.

First, the brake caliper Bk will be described. As shown in FIG. 2, this brake caliper Bk includes a housing 1, the friction pad driving assembly Mk, the friction pad 6, and a locking mechanism (not shown) for a parking brake. The friction pad driving assembly Mk includes: an electric motor 2; a speed reduction mechanism 3 that reduces a speed of rotation or number of rotation per unit time of the electric motor 2; and a linear motion mechanism 4 that converts rotation of the electric motor 2 into linear motion of the friction pad 6 via the speed reduction mechanism 3. The electric motor 2 is supported by the housing 1. The linear motion mechanism 4 is incorporated in the housing 1 so as to apply a braking force from the friction pad 6 to the brake rotor 5 by an output from the electric motor 2. The housing 1 has an opening end covered with a cover 8.

The linear motion mechanism 4 will be described. The linear motion mechanism 4 includes: a rotation shaft 9 that is rotationally driven by the electric motor 2; a conversion mechanism 10 that converts rotation motion of the rotation shaft 9 into linear motion; and restraining parts 11 and 12. The conversion mechanism 10 includes a linear motion portion 14, a bearing member 15, an annular thrust plate 16, a thrust bearing 17, a rolling bearing 18, a carrier 19, slide bearings 20 and 21, and a plurality of planetary rollers 22.

The cylindrical linear motion portion 14 is supported on an inner circumferential surface of the housing 1 such that the linear motion portion 14 is prevented from rotating and is movable in the axial direction. On the inner circumferential surface of the linear motion portion 14, a helical projection is helically formed so as to project radially inward by a predetermined distance. The plurality of planetary rollers 22 mesh with the helical projection.

The bearing member 15 is provided at one end side, in the axial direction, of the linear motion portion 14 in the housing 1. The bearing member 15 includes a flange portion that extends radially outward, and a boss portion. The plurality of rolling bearings 18 are fitted in the boss portion, and the rotation shaft 9 is fitted onto an inner diameter surface of an inner ring of each of the rolling bearings 18. The rotation shaft 9 is rotatably supported by the bearing member 15 through the plurality of rolling bearings 18.

The carrier 19 is provided on the inner circumference of the linear motion portion 14 so as to be rotatable about the rotation shaft 9. The carrier 19 has disks that oppose each other in the axial direction. The disk proximate to the bearing member 15 may be referred to as an inner disk, and the other disk may be referred to as an outer disk. The outer disk is provided with a distance adjustment member on a side surface thereof opposing the inner disk such that the distance adjustment member projects in the axial direction from an outer circumferential edge portion of the side surface. For adjusting the distances between the plurality of planetary rollers 22, a plurality of the distance adjustment members are arranged so as to be spaced equidistantly from each other in the circumferential direction. The two disks are integrated with each other through the distance adjustment members.

The inner disk is rotatably supported by the slide bearing 20 fitted between the inner disk and the rotation shaft 9. The outer disk has a shaft insertion hole formed at the center thereof, and the slide bearing 21 is fitted into the shaft insertion hole. The outer disk is rotatably supported through the slide bearing 21 by the rotation shaft 9. The restraining parts 11 and 12 for receiving thrust load and restraining the position of the rotation shaft 9 in the axial direction are provided on opposite end portions of the rotation shaft 9. Each of the restraining parts 11 and 12 includes, for example, a stopper composed of a washer or the like. Retaining rings for preventing the restraining parts 11 and 12 from being removed are provided on the opposite end portions of the rotation shaft 9.

The carrier 19 has a plurality of roller shafts 23 spaced from each other in the circumferential direction. Opposite end portions of each roller shaft 23 are supported by and across the inner disk and the outer disk. That is, each of the two disks has a plurality of shaft insertion holes that are formed as oblong holes, and the opposite end portions of each roller shaft 23 are inserted into the corresponding shaft insertion holes, whereby the roller shafts 23 are supported so as to be movable in the radial direction within the range of each corresponding shaft insertion hole. An elastic ring 24 is extended over the plurality of roller shafts 23 at each of the opposite end portions thereof in the axial direction so as to urge the roller shafts 23 radially inward.

The planetary rollers 22 are rotatably supported by the corresponding roller shafts 23, and each planetary roller 22 is disposed between the outer circumferential surface of the rotation shaft 9 and the inner circumferential surface of the linear motion portion 14. Each planetary roller 22 is pressed against the outer circumferential surface of the rotation shaft 9 by the urging force of the elastic ring 24 extended over the plurality of roller shafts 23. By rotation of the rotation shaft 9, each planetary roller 22 that is in contact with the outer circumferential surface of the rotation shaft 9 rotates due to contact friction. On the outer circumferential surface of the planetary roller 22, a helical groove is formed so as to mesh with the helical projection of the linear motion portion 14.

The speed reduction mechanism 3 is a mechanism that reduces the speed of rotation of the electric motor 2 and transmits the reduced rotation to an output gear 25 fixed to the rotation shaft 9. The speed reduction mechanism 3 includes a plurality of gear trains (not shown). In this example, the speed reduction mechanism 3 sequentially reduces, by the above-mentioned gear trains, the speed of rotation of an input gear (not shown) mounted to a rotor shaft (not shown) of the electric motor 2, and allows the reduced rotation to be transmitted to the output gear 25. The locking mechanism for parking is configured to be able to switch between: a locking state in which a braking force reducing operation of the linear motion mechanism 4 is inhibited; and an unlocking state in which the braking force reducing operation is allowed. When the locking mechanism is led to the locking state, the output of the electric motor 2 is suspended resulting in at the parking brake state.

Figure 3:
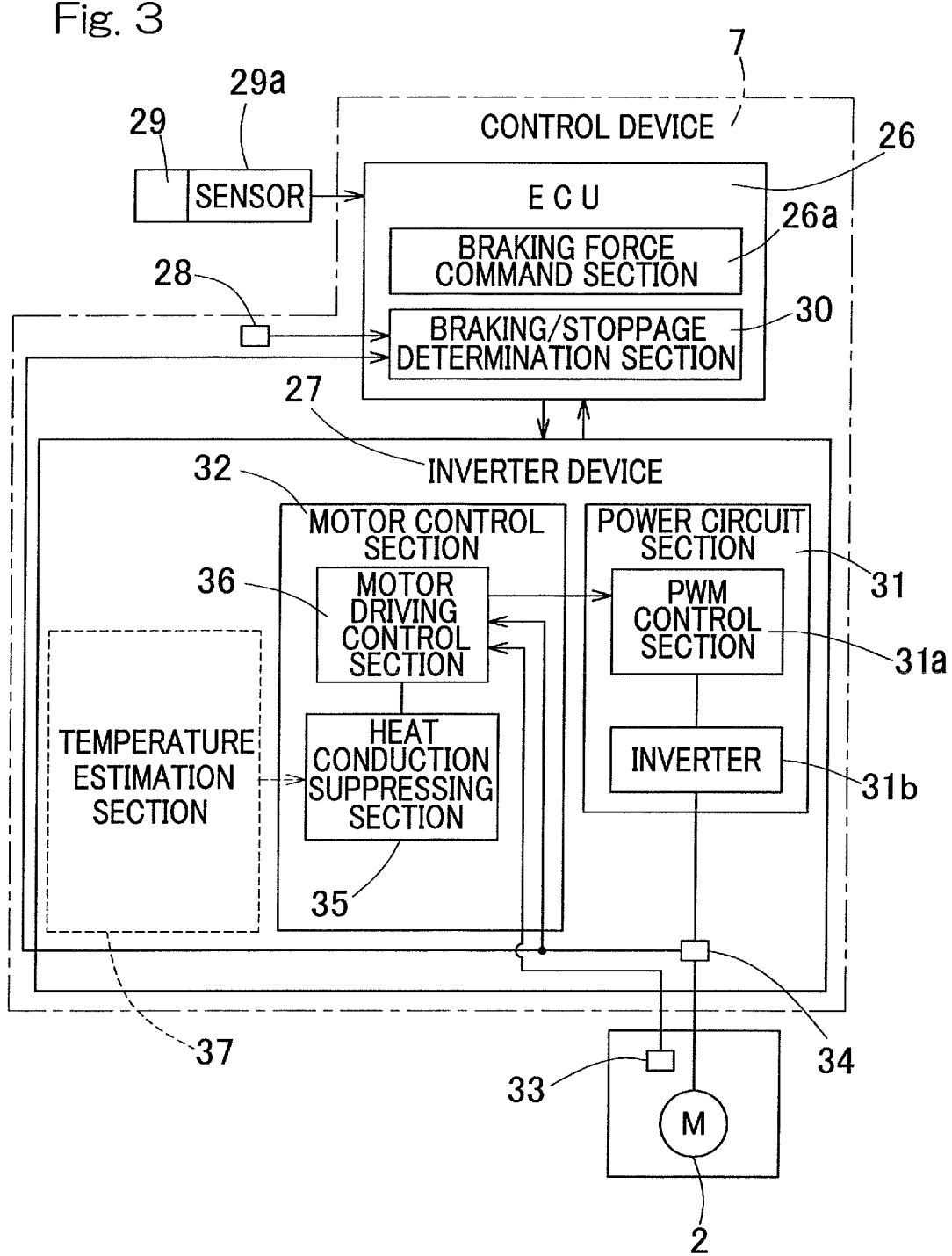
FIG. 3 is a block diagram of a control system of the brake device system.

FIG. 3 is a block diagram of a control system of the brake device system. The control device 7 of the brake device system includes an ECU 26, an inverter device 27, and a vehicle speed detector 28. As the ECU 26 which is a higher-order control unit of the inverter device 27, an electric control unit that performs overall control of a vehicle is adopted, for example. The ECU 26 includes a braking force command section 26a and a braking/stoppage determination section 30.

In response to an output from a sensor 29a, which varies according to the amount of operation of a brake pedal serving as brake operation portion 29, the braking force command section 26a generates and outputs a command value of a target braking force by using a LUT (Look Up Table) implemented in software or hardware, or a predetermined transform function contained in a library of software or hardware equivalent thereto, etc. The braking/stoppage determination section 30 causes the friction pad 6 (FIG. 2) to come into contact with the brake rotor 5 (FIG. 2) of each brake device, and determines whether or not the vehicle is braking or being kept braked (that is, kept stopped or at stoppage) when the vehicle speed of the vehicle is zero or a low speed near zero. That is, the braking/stoppage determination section 30 obtains, by calculation, an appropriate estimated value of the braking force on the basis of, for example, an output from the sensor 29a and a motor current detected by the current detector 34. The relationship between the output of the sensor 29a, the motor current, and the estimated value of the braking force is determined in advance on the basis of a result of an experiment, simulation, or the like.

The braking/stoppage determination section 30 obtains the estimated value of the braking force, and determines whether or not the vehicle speed detected by the vehicle speed detector 28 is lower than or equal to a threshold value (including a vehicle speed of 0). Specifically, the braking/stoppage determination section 30 is configured as a hardware circuit or a software function that is able to perform: determination as to whether or not a vehicle is braking or being kept braked when the speed of the vehicle is low; determination as to whether or not the speed of the vehicle is lower than or equal to a threshold value; and calculation to obtain the appropriate estimated value of a braking force, upon receiving an output from the sensor 29a, the detected motor current, and an input of the vehicle speed, by using a LUT implemented in software or hardware, or a predetermined transform function contained in a library of software or hardware equivalent thereto, etc. (hereinafter referred to as "realization model", too).

The inverter device 27 includes a power circuit section 31 provided for each electric motor 2, a motor control section 32 that controls the power circuit section 31, and the current detector 34. Since the plurality of inverter devices 27 described above have the same structure, only one inverter device 27 is illustrated in FIG. 3 while illustration of other inverter devices 27 is omitted. The motor control section 32 is composed of a computer including a processor, a ROM (Read Only Memory) including a program to be executed by the processor, and electronic circuits such as a RANI (Random Access Memory) and a co-processor. According to the braking force command value provided by the braking force command section 26a and a value outputted from a heat conduction suppressing section 35 described later, the motor control section 32 converts these values into a current command represented by a voltage value, and provides the current command to the power circuit section 31. The motor control section 32 has a function of outputting, to the ECU 26, various kinds of information such as detected values and control values regarding the electric motor 2.

The power circuit section 31 includes: an inverter 31b that converts a DC power from a power supply such as a battery (not shown) into a three-phase AC power used to drive the electric motor 2; and a PWM control section 31a that controls the inverter 31b. The electric motor 2 is composed of a three-phase synchronous motor or the like. The inverter 31b is composed of a plurality of semiconductor switching elements (not shown), and the PWM control section 31a performs pulse width modulation of the inputted current command and provides an on/off command to each of the semiconductor switching elements.

The motor control section 32 includes a motor driving control section 36 as a basic control section thereof. According to the braking force command value provided by the braking force command section 26a and the value outputted from the heat conduction suppressing section 35, the motor driving control section 36 converts these values into the current command represented by the voltage value, and provides a motor operation command value, including the current command, to the PWM control section 31a of the power circuit section 31. Specifically, the motor driving control section 36 is configured as a hardware circuit or a software function that is able to calculate the motor operation command value including the current command and output the motor operation command value to the PWM control section 31a, by using the above-described realization model, upon receiving the braking force command value and the value outputted from the heat conduction suppressing section 35. Further, the motor driving control section 36 obtains, from the current detector 34, the motor current applied from the inverter 31b to the electric motor 2, and performs a current feedback control for the braking force command value. Further, the motor driving control section 36 obtains, from the motor rotation angle detector 33, a rotation angle of the rotor (not shown) of the electric motor 2, and provides a current command to the PWM control section 31a such that efficient motor driving in accordance with the rotor rotation angle can be performed.

The motor control section 32 is provided with the heat conduction suppressing section 35. When the braking/stoppage determination section 30 obtains the estimated value of the braking force and determines that the vehicle speed detected by the vehicle speed detector 28 is lower than or equal to the predetermined vehicle speed, the heat conduction suppressing section 35 reduces the braking force caused by a part of the plurality of brake devices, thereby reducing heat conductivity, to the friction pad driving assembly Mk (FIG. 2), of brake friction heat which is generated by friction between the brake rotor 5 (FIG. 2) and the friction pad 6 (FIG. 2). Specifically, the heat conduction suppressing section 35 is configured as a hardware circuit or a software function that is able to output a command to reduce the braking force of a predetermined brake device, by using the realization model, upon receiving the estimated value of the braking force and the determination result of the vehicle speed which are provided from the braking/stoppage determination section 30.

In FIG. 4, Graph (a) shows a correlation between the pressing force of the friction pad 6 (FIG. 2) in the brake device system and heat conductivity, to the friction pad driving assembly Mk (FIG. 2), of the brake friction heat which is generated by friction between the brake rotor 5 (FIG. 2) and the friction pad 6 (FIG. 2). In FIG. 4, Graph (b) shows a correlation between the pressing force of the friction pad and the braking force. Assuming that a friction coefficient between a tire and a road surface is μ, a value obtained by multiplying the friction coefficient μ by the pressing force of the friction pad 6 (FIG. 2), taking into consideration a later-described friction coefficient of the friction pad, is the braking force.

As shown in Graph (a) of FIG. 4, in an initial state in which the pressing force of the friction pad 6 (FIG. 2) is zero, since only heat conduction and heat radiation through air in a clearance in the friction pad 6 (FIG. 2) occur, heat conductivity is low. When the friction pad 6 (FIG. 2) is pressed through operation of the brake operation portion 29 (FIG. 3), the contact area between the respective members (e.g., the brake rotor, the friction pad, etc.) is increased and thus heat conductivity is increased.

It is generally known that the heat conductivity exhibits strong linearity when the pressing force (the surface pressure of the contact surface) of the friction pad 6 (FIG. 2) is low, but nonlinearity thereof is getting strong with an increase in the pressing force. This property mainly depends on the material and/or the surface roughness of the respective members described above. That is, in a case where the total sum (or average) of the pressing forces of the plurality of brake devices is constant in the heat conductive path in which a plurality of contact surfaces exist, this nonlinearity provides a tendency that the average heat conductivity is increased as the pressing forces of the plurality of contact surfaces are more uniform whereas the average heat conductivity is reduced as the pressing forces of the contact surfaces are less uniform, as described later in detail.

Regarding the correlation between the pressing force of the friction pad and the braking force shown in Graph (b) of FIG. 4, when it is assumed that the friction coefficient of the friction pad (hereinafter referred to as "friction pad friction coefficient") is constant, the correlation is linear because, basically, a value obtained by multiplying the friction coefficient μ by the surface pressure is the braking force. For example, regarding friction pad pressing forces $F_1$ and $F_2$ each having a predetermined bias with respect to a specific friction pad pressing force F and having an average thereof corresponding to F ($F=(F_1+F_2)/2$), as shown in Graph (a) of FIG. 4, the above-mentioned average (($H_1+H_2$)/2) of heat conductivities at the pressing forces $F_1$ and $F_2$ is reduced with respect to heat conductivity H at the pressing force F. On the other hand, regarding the braking force, as shown in Graph (b) of FIG. 4, the braking force D at the pressing force F substantially coincides with the average braking force at the pressing forces $F_1$ and $F_2$.

FIG. 5 is a conceptual diagram showing an operation of the heat conduction suppressing section at braking, in the brake device system. FIG. 5 shows an example of a braking operation when a vehicle is braking from a specific vehicle speed. Description will be given with reference also to FIG. 3. Brake devices A and B shown in FIG. 5 are, for example, brake devices required to operate with different pressing forces, such as a front-wheel brake device and a rear-wheel brake device of a four wheel car, respectively.

As shown in Graph (a) of FIG. 5, a normal braking operation is performed from the start of braking to a vehicle speed corresponding to the above-mentioned threshold value. In this case, the braking/stoppage determination section 30 determines that the vehicle speed detected by the vehicle speed detector 28 is greater than the threshold value, and therefore a control by the heat conduction suppressing section 35 is not executed. In this case, the motor driving control section 36 converts a braking force command value into the current command represented by the voltage value, and provides the PWM control section 31a with the motor operation command value including the current command.

When the vehicle speed becomes lower than or equal to the threshold value, an operation of the present embodiment is performed. That is, the braking/stoppage determination section 30 determines that the vehicle speed is lower than or equal to the threshold value, from the value detected by the vehicle speed detector 28, whereby the heat conduction suppressing section 35 reduces the braking force of one brake device A as shown in Graphs (b) and (c) of FIG. 5 to reduce heat conductivity. Along with this, the control device 7 increases the braking force of the other brake device B so as to keep the total braking force (represented by a dotted line in Graph (b) of FIG. 5) of all of the brake devices A and B constant.

At this time, according to the correlation of heat conductivity shown in Graph (a) of FIG. 4, the average heat conductivity is reduced as the respective braking forces are less uniform (i.e., uneven). Therefore, as shown in Graph (b) of FIG. 5, regarding the plurality of brake devices A and B, an operation of reducing the braking force of one brake device A and increasing the braking force of the other brake device B and an operation reverse to the above operation are alternately performed, whereby, as shown in Graph (c) of FIG. 5, the amount of heat (refer to a dotted line in Graph (c) of FIG. 5) transmitting the brake friction heat which is generated by friction between the brake rotor 5 (FIG. 2) and the friction pad 6 (FIG. 2) is finally reduced by the operation of the present embodiment.

The above-mentioned threshold value of the vehicle speed may be arbitrarily set. For example, if the vehicle speed is zero or a low speed (e.g., several km/h) near zero, adverse effect on behavior and/or motion characteristics of the vehicle can be reduced. Here, while at least several minutes or more are needed until temperature change in the entire brake device due to heat energy generated by friction between the brake rotor 5 (FIG. 2) and the friction pad 6 (FIG. 2) reaches a balanced point, the braking time is as extremely short as about several seconds. Therefore, it is considered that sufficient effect is achieved for the purpose of reducing heat conductivity to the brake devices.

For example, in a case of a four wheel car, optimum balance of the respective braking forces and/or rotation of braking force control by the heat conduction suppressing section 35 of the respective brake devices may be determined on the basis of the degree of temperature rise of the brake rotor 5 (FIG. 2) which is estimated from the vehicle speed and deceleration degree, the front and rear brake balance, the volume of the brake rotor 5 (FIG. 2), the volume of each brake device, etc.

Figure 6A:
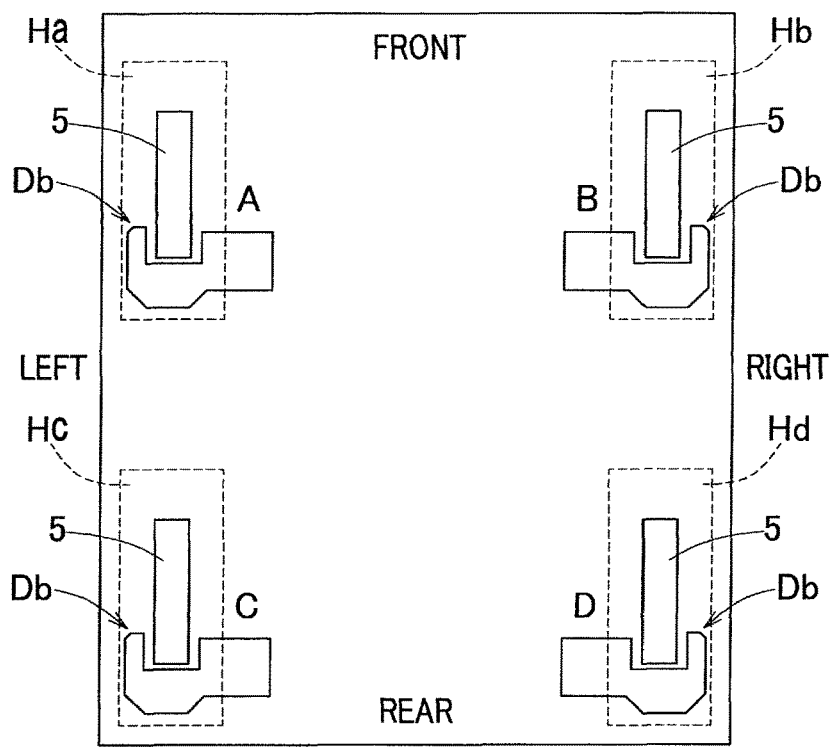
FIG. 6A shows an example of brake devices mounted to four wheels, respectively.
Figure 6B:
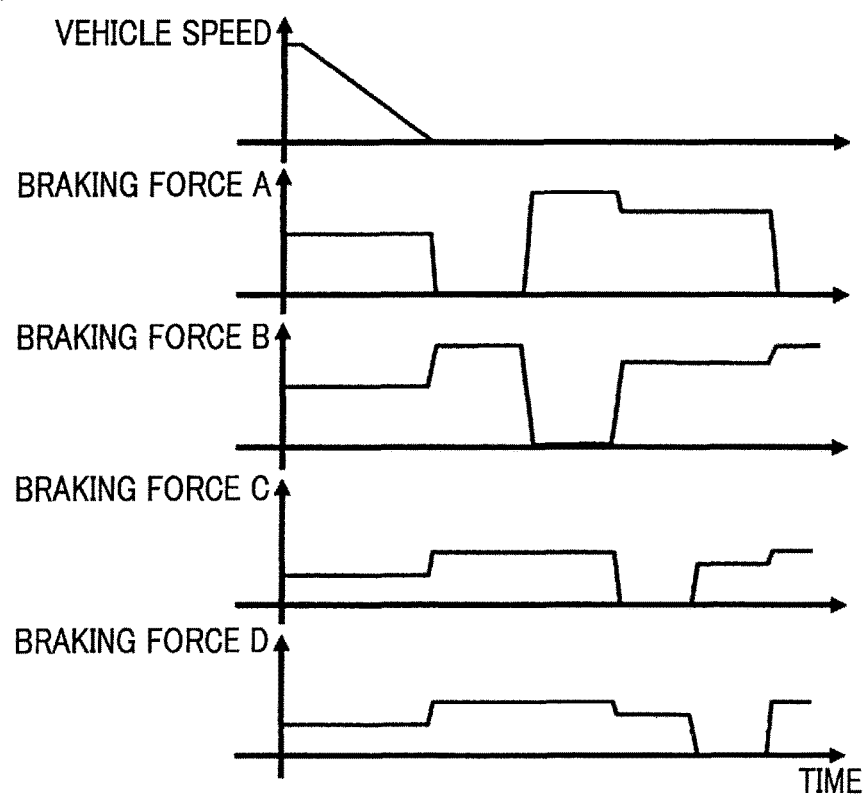
FIG. 6B shows variations in a vehicle speed and braking forces when the four wheel car shown in FIG. 6A is braking.

FIG. 6A shows an example in which brake devices Db are mounted to four wheels, respectively. FIG. 6B shows variations in a vehicle speed and braking forces A to D when the four wheel car shown in FIG. 6A is braking. FIG. 6B shows a case in which a braking force required by an operator of this four wheel car is constant along a lapse of time.

Assuming that an initial temperature of the brake rotor is $T_0$, the braking force of each brake rotor 5 is Fx, the total braking force is F, a kinetic energy change amount of the vehicle is ΔE, and a heat capacity of the brake rotor 5 is Cx, temperature T of each brake rotor 5 during braking is determined by the following expression:

$$T = T_0 + (\Delta E \cdot (Fx/F)/Cx)$$

In addition, the amount of heat transferred is determined on the basis of the temperature transferred from the brake rotor 5 to a brake actuator (or brake fluid) or the like, the temperature of the brake rotor, the correlation of the heat conductivity shown in Graph (a) of FIG. 4, and the heat capacity of the brake actuator. As a matter of fact, it is difficult to model all heat fluxes, and strict temperature control is not required. Therefore, temperature rise of each brake device Db during braking may be grasped in advance through a test or the like and, for example, the order of the braking forces to be reduced by the heat conduction suppressing section 35 may be determined in advance.

As shown in FIG. 6B, generally, there is a tendency that temperature rise of front brake devices Db (A and B) each having a large braking force is greater than that of the rear brake devices Db (C and D). Therefore, the operation of the heat conduction suppressing section 35 according to the present embodiment is performed, wheel by wheel, from the left and right front brake devices Db. From a point in time when the vehicle speed substantially reaches zero, the braking forces are reduced alternately in order of A→B→C→D by the heat conduction suppressing section 35, thereby to reduce heat conductivity. At this time, the braking forces of the brake devices Db, other than the brake device Db whose braking force is reduced, are increased so as to keep the total sum of the braking forces of all the brake devices Db constant (or equal).

Figure 7:
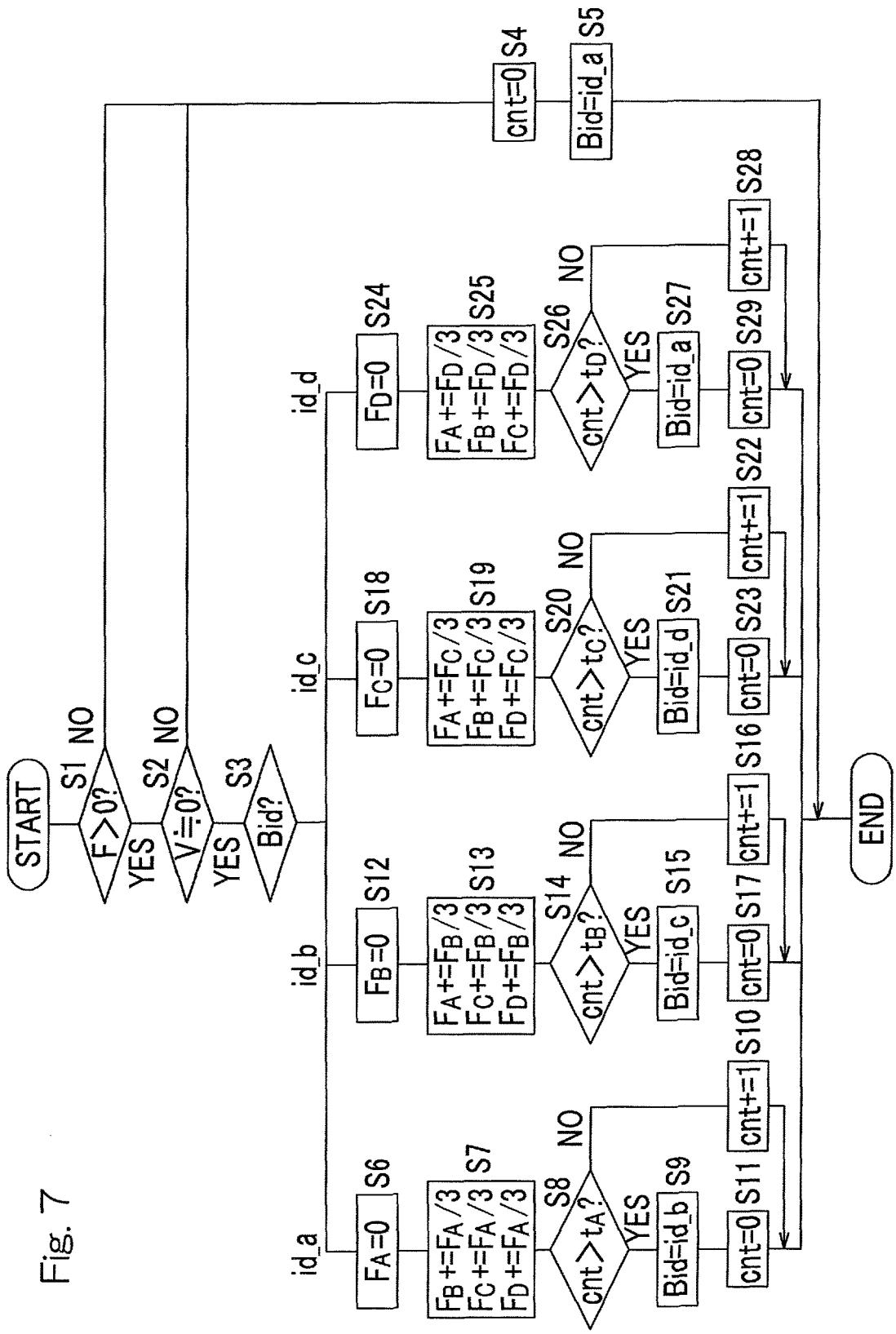
FIG. 7 is a flowchart showing stepwise an operation for braking forces of the brake device system.

FIG. 7 is a flowchart showing stepwise an operation for braking forces of the brake device system. Description will be given with reference to FIG. 3 and FIG. 6A. For example, the present process is started when a vehicle is powered on, and the braking/stoppage determination section 30 determines whether or not the total braking force F is greater than zero (step S1). When the result of the determination is negative (No in step S1), a pressure reduction time of the braking force of each brake device is initialized (cnt=0) (step S4). Next, the braking/stoppage determination section 30 records, in a recording portion (not shown), id_a which is a brake ID as an option (Bid) in step S3 described later (step S5). Thereafter, the present process is ended. Using braking forces $F_A$, $F_B$, $F_C$, and $F_D$ of the brake devices A, B, C, and D, $F = F_A + F_B + F_C + F_D$ is satisfied.

Upon determining that the total braking force F is greater than zero (Yes in step S1), the braking/stoppage determination section 30 determines whether or not the vehicle speed v is zero or a low speed near zero (step S2). When the result of the determination is negative (No in step S2), the process goes to step S4. Upon determining that the vehicle speed is zero or a low speed near zero (Yes in step S2), the control device 7 checks the options recorded in the recording portion (step S3).

When the id_a which is a brake ID is recorded as an option, the heat conduction suppressing section 35 reduces the pressure of the braking force $F_A$ of the brake device A to zero (step S6), and adds ⅓ of the braking force $F_A$, before pressure-reduced, to each of the braking forces $F_B$, $F_C$, and $F_D$ of the brake devices B, C, and D (step S7). Next, the heat conduction suppressing section 35 determines whether or not the pressure reduction time (cnt) exceeds a set time $t_A$ for reducing the pressure of the braking force $F_A$ (step S8). When the result of the determination is negative (No in step S8), the braking/stoppage determination section 30 adds a count (cnt) of time for reducing the pressure of the braking force $F_A$ (step S10) to end the present process.

Upon determining that the set time $t_A$ is exceeded (Yes in step S8), the braking/stoppage determination section 30 records, in the recording portion, id_b which is a brake ID as an option in step S3 (step S9). Next, the braking/stoppage determination section 30 initializes the pressure reduction time of the braking force of each brake device (cnt=0) (step S11), and thereafter, ends the present process.

In the following description, step S3 and subsequent steps will be described with steps S1 and S2 being skipped. If the id_b which is a brake ID is recorded in the recording portion as an option in step S3, the heat conduction suppressing section 35 reduces the pressure of the braking force $F_B$ of the brake device B to zero (step S12), and reduces each of the braking forces $F_A$, $F_C$, and $F_D$ of the brake devices A, C, and D to ⅓ of the braking force $F_B$ before pressure-reduced (step S13). Next, the heat conduction suppressing section 35 determines whether or not the pressure reduction time exceeds a set time $t_B$ for reducing the pressure of the braking force $F_B$ (step S14).

When the result of the determination is negative (No in step S14), a count of time for reducing the pressure of the braking force $F_B$ is added (step S16) to end the present process. Upon determining that the set time $t_B$ is exceeded (Yes in step S14), the braking/stoppage determination section 30 records, in the recording portion, id_c which is a brake ID as an option in step S3 (step S15). Next, the braking/stoppage determination section 30 initializes the pressure reduction time of the braking force of each brake device (cnt=0) (step S17), and thereafter ends the present process.

When the id_c which is a brake ID is recorded in the recording portion as an option in step S3, the heat conduction suppressing section 35 reduces the pressure of the braking force $F_C$ of the brake device C to zero (step S18), and adds ⅓ of the braking force $F_C$ before pressure-reduced to each of the braking forces $F_A$, $F_B$, and $F_D$ of the brake devices A, B, and D (step S19). Next, the heat conduction suppressing section 35 determines whether or not the pressure reduction time exceeds a set time $t_C$ for reducing the pressure of the braking force $F_C$ (step S20).

When the result of the determination is negative (No in step S20), a count of time for reducing the pressure of the braking force $F_C$ is added (step S22) to end the present process. Upon determining that the set time $t_C$ is exceeded (Yes in step S20), the braking/stoppage determination section 30 records, in the recording portion, id_d which is a brake ID as an option in step S3 (step S21). Thereafter, the pressure reduction time of each braking force is initialized (cnt=0) (step S23), and thereafter the present process is ended.

When the id_d which is a brake ID is recorded in the recording portion as an option in step S3, the pressure of the braking force $F_D$ of the brake device D is reduced to zero (step S24), and ⅓ of the braking force $F_D$ before pressure-reduced is added to each of the braking forces $F_A$, $F_B$, and $F_C$ of the brake devices A, B, and C (step S25). Upon determining that the pressure reduction time does not exceed the set time $t_D$ for reducing the pressure of the braking force $F_D$ (No in step S26), a count of time for reducing the pressure of the braking force $F_D$ is added (step S28) to end the present process. Upon determining that the pressure reduction time exceeds the set time $t_D$ (Yes in step S26), the id_a which is a brake ID is recorded in the recording portion as an option in step S3 (step S27), and the pressure reduction time of each braking force is initialized (cnt=0) (step S29), and thereafter the present process is ended.

According to the brake device system described above, upon determining that the vehicle is braking or being kept stopped, the heat conduction suppressing section 35 reduces the braking force of the part of the plurality of brake devices, thereby to reduce heat conductivity of brake friction heat to the friction pad driving assembly Mk, i.e., the brake caliper Bk. Thus, it is possible to suppress transfer of heat generated by friction between the brake rotor 5 (FIG. 2) and the friction pad 6 (FIG. 2) to the electric motor 2 and the like of the brake device Db, whereby heat load on the electric motor 2 and the like can be reduced.

Next, the heat conduction suppressing section 35 compensates for a reduction in the braking force of the part of the brake devices by using the remaining brake devices to keep the total sum of the braking forces of all the brake devices constant. Thus, even when the braking force of a part of the brake devices is reduced, since the total sum of the braking forces of all the brake devices is kept constant, undesirable increase in the braking distance can be avoided.

Other embodiments will be described. As shown by a dotted line in FIG. 3, each brake device may be provided with a temperature estimation section 37 that estimates the temperature of the brake rotor or the friction pad of the brake device. The control device 7 may cause the heat conduction suppressing section 35 to operate when the braking/stoppage determination section 30 has determined that the speed of the vehicle is zero or almost zero and when the temperature estimated by any temperature estimation section 37 is higher than or equal to a threshold value. As an example of the temperature estimation section 37, a thermistor or the like may be adopted. A temperature rise of each brake device during braking may be grasped through a test, simulation, or the like, and the above-mentioned threshold value may be set on the basis of the grasped result. In this case, control for suppressing the braking force of each brake device can be precisely performed on the basis of the temperature of the brake rotor 5 or the friction pad 6 of each brake device. The thermistor or the like is provided in the brake caliper Bk.

In a case where a vehicle is configured to include one or more brake devices at each of four quadrants about the center of gravity on a plane orthogonal to a direction of the gravity that acts on the vehicle, when the control device 7 causes the heat conduction suppressing section 35 to execute the operation of the above-described embodiment, the control device 7 may set a braking force of each brake device such that turning moment of the vehicle that is caused by the operation of the brake device becomes lower than or equal to a predetermined value. In this case, it is possible to stabilize the behavior of the vehicle by suppressing, as much as possible, the turning moment of the vehicle that is caused by the operation of the brake device when the vehicle is traveling.

The brake device system is not limited to an electric brake device system. For example, in a hydraulic brake system or the like configured to apply oil pressure of a master cylinder to each wheel through a pipe, a fluid pressure control actuator including valves and a pump, such as an ABS actuator, may be adopted.

In the above-described embodiment, the braking force is reduced to near zero. However, for example, in a case where the braking force of a base brake device is great and may exceed the maximum braking force of another brake device, the amount of reduction in the braking force may be varied depending on the situation. Further, in the above-described embodiment, the amount of the reduced braking force is equally divided into three to increase the braking forces of other braking devices. However, the amounts of increase in the braking forces of the other brake devices may be different from each other. For example, the front brake device whose maximum braking force is generally large may be preferentially used, or conversely, the rear brake device whose temperature rise is generally supposed to be small may be preferentially used.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . electric motor
4 . . . linear motion mechanism
5 . . . brake rotor
6 . . . friction pad
7 . . . control device
30 . . . braking/stoppage determination section
35 . . . heat conduction suppressing section
37 . . . temperature estimation section
Mk . . . friction pad driving assembly

What is claimed is:

1. A brake device system including a plurality of brake devices mounted to a vehicle, each brake device comprising a brake rotor, a friction pad configured to come into contact with the brake rotor and generate a braking force, a friction pad driving assembly configured to cause the friction pad to come into contact with the brake rotor, and a control device configured to control the braking force by using the friction pad driving assembly, wherein
the control device includes:
a braking/stoppage determination section configured to cause the friction pad to come into contact with the brake rotor of each of the brake devices, and determine whether or not the vehicle is braking or being kept stopped; and
a heat conduction suppressing section configured to, when the braking/stoppage determination section has determined that the vehicle is braking or being kept stopped, reduce the braking force of a part of the plurality of brake devices, thereby to reduce heat conductivity of brake friction heat to the friction pad driving assembly.

2. The brake device system as claimed in claim 1, wherein the heat conduction suppressing section is configured to have a function of, while the braking force of the part of the plurality of brake devices is reduced, compensating for the reduction of the braking force by using the other brake devices, thereby to keep a total sum of the braking forces of all the brake devices equal to a value in a case where the braking force of the part of the plurality of brake devices is not reduced.

3. The brake device system as claimed in claim 1, wherein the heat conduction suppressing section is configured to cause reduction in the braking force of the part of the plurality of brake devices in a case where a speed of the vehicle is lower than or equal to a threshold value.

4. The brake device system as claimed in claim 1, wherein the vehicle is provided with one or more brake devices at each of four quadrants about the center of gravity on a plane orthogonal to a direction of the gravity that acts on the vehicle, and the control device, when causing the heat conduction suppressing section to operate, is configured to set a braking force of each brake device so that a turning moment, of the vehicle, that is caused by an operation of the brake device, becomes lower than or equal to a predetermined value.

5. The brake device system as claimed in claim 1, wherein each brake device is provided with a temperature estimation section configured to estimate a temperature of the brake rotor or the friction pad of the brake device, and the control device is configured to cause the heat conduction suppressing section to operate, when the temperature estimated in any temperature estimation section is higher than or equal to a threshold value.

6. The brake device system as claimed in claim 1, wherein the friction pad driving assembly includes an electric motor, and a linear motion mechanism configured to convert rotary motion of the electric motor into linear motion of the friction pad.

* * * * *